Aug. 25, 1931.  A. D. MacLEAN  1,820,358
MULTIPLE FLOW REGULATOR
Filed Feb. 25, 1927   2 Sheets-Sheet 1
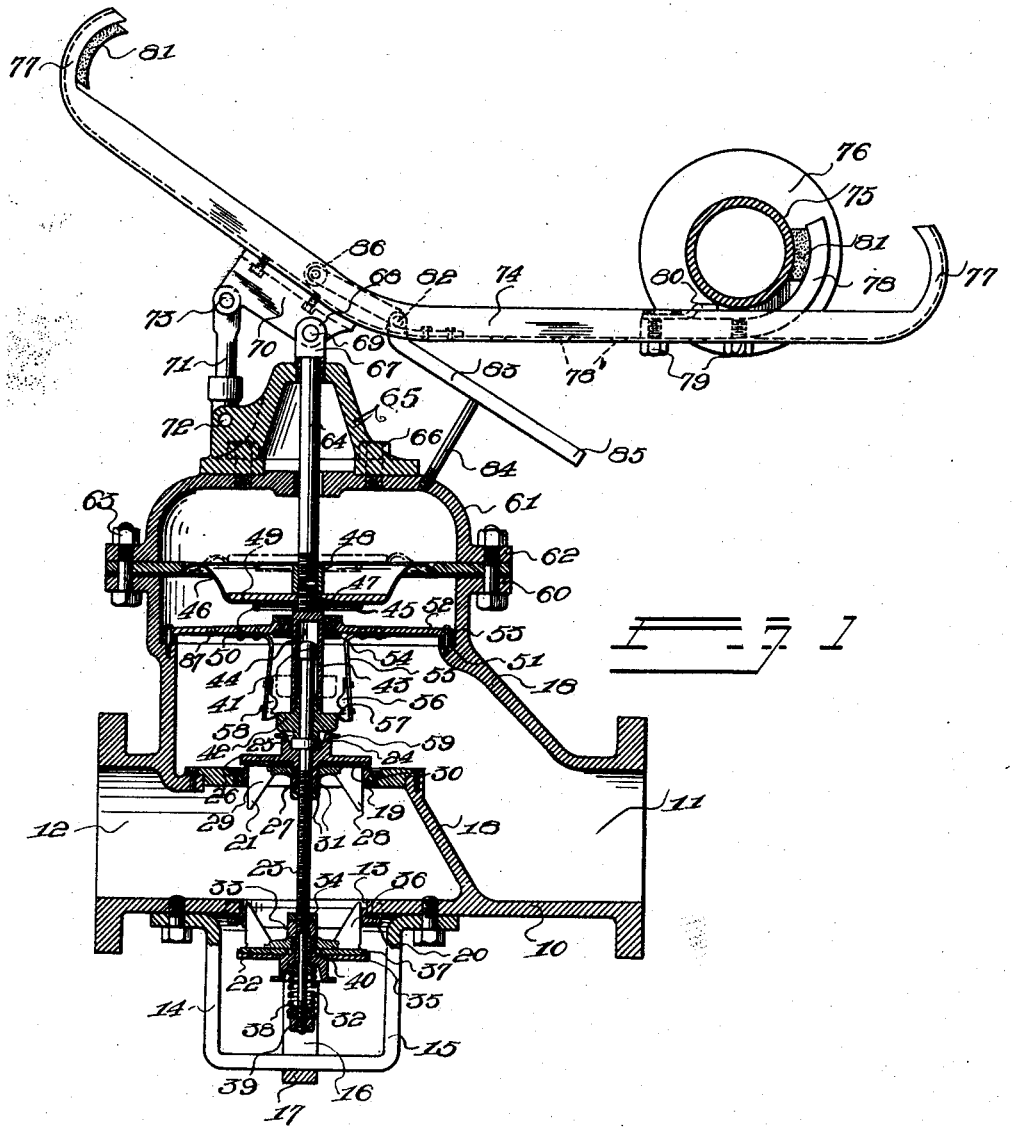
Inventor
Allen D. MacLean
William A. Strauch
Attorney

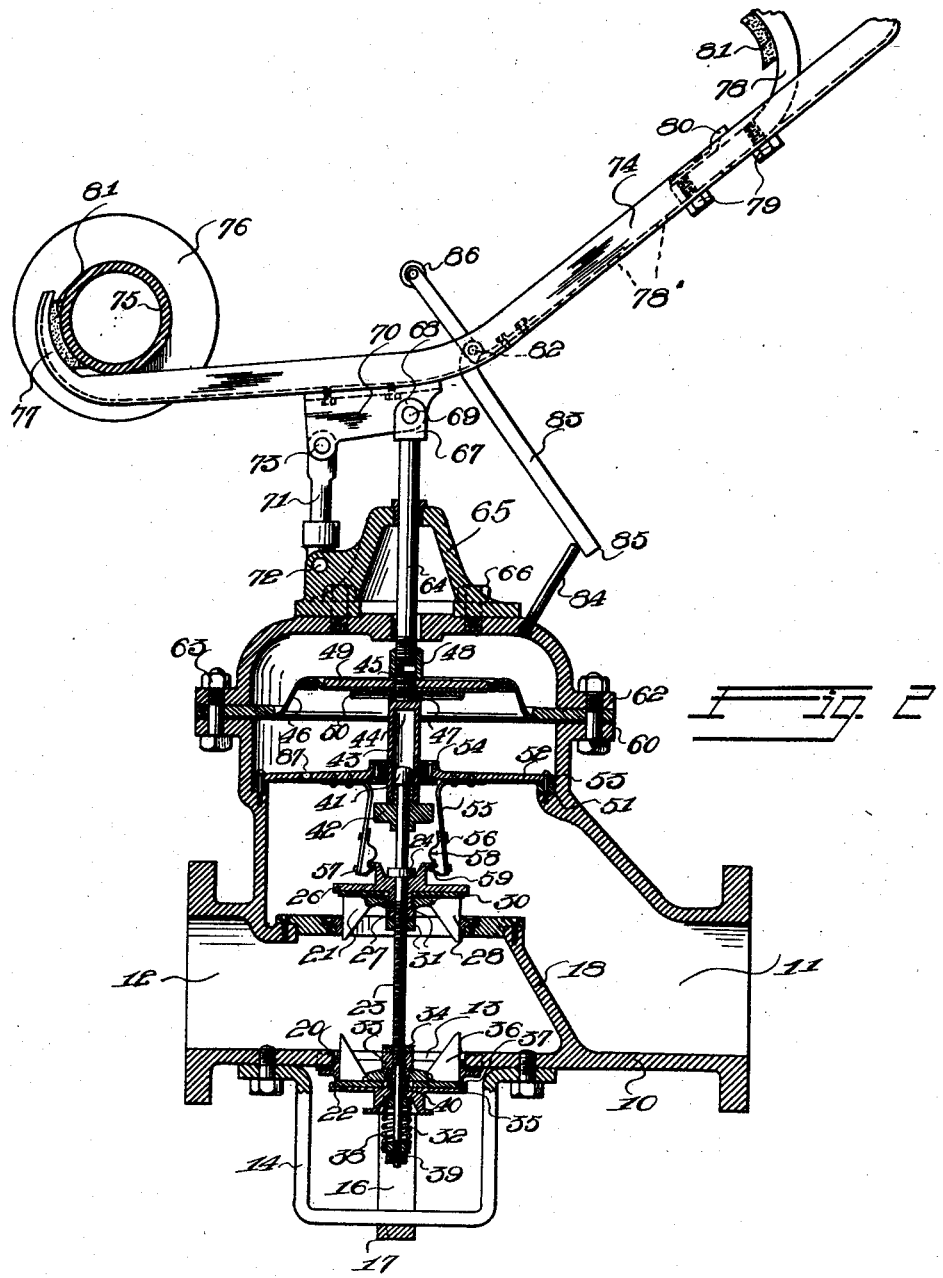

Patented Aug. 25, 1931                                                              1,820,358

UNITED STATES PATENT OFFICE

ALLEN D. MacLEAN, OF PITTSBURGH, PENNSYLVANIA, ASSIGNOR TO PITTSBURGH EQUITABLE METER COMPANY, OF PITTSBURGH, PENNSYLVANIA

MULTIPLE FLOW REGULATOR

Application filed February 25, 1927. Serial No. 170,939.

This invention relates to a regulator for the flow of fluids from a plurality of sources to a single outlet. It is frequently desirable to supply a fluid from one source until the pressure from that source drops to a minimum when it becomes necessary to close a valve governing said source and open a valve in a conduit from another source to continue and maintain a flow in the outlet. This system is applicable to the flow of gases of the same or differing kinds. Heretofore either hand operated or separately operating automatic valves have been provided to control fluid flow as above outlined. Hand or separate automatic operation of the controlling valves is troublesome and unsatisfactory in operation especially when the closing of the valve controlling the flow from one source should take place simultaneously with the opening of the valve controlling the flow from the other source.

It is the primary object of this invention to provide a valve controlling two sources of supply that is automatically actuated when the pressure from the control source drops below a minimum, and that automatically resumes its former position when the control pressure again reaches a predetermined value.

A further object of the invention is to provide a unitary valve to automatically alternately supply fluid of the same or different kinds to the outlet of the valve.

Another object of the invention is to provide a valve that maintains the flow from one of a plurality of sources whenever the pressure from that source reaches or exceeds a predetermined value and that automatically connects another source to the valve outlet whenever the flow from the controlling source is interrupted.

Another object of the invention is to provide a valve that operates with a snap action to quickly bring about the desired manipulation of the valve when the controlling pressure necessitates a shifting of the valve.

Another object of the invention is to provide an automatic quick-acting valve controlling a plurality of fluid sources and including means to hold the valve from accidental displacement from either of its extreme positions.

Another object of the invention lies in the provision of a positive holding means to maintain the valve in position and means movable with respect to said positive holding means to insure the correct relative positions of the holding means when the valve is opened or closed.

Further objects will appear as the description of the invention proceeds with reference to the accompanying drawings in which, Figure 1 is a vertical section of the regulator, the valve parts being shown in full lines in the position they assume when the pressure from the control source has reached a predetermined minimum, and in dotted lines when the pressure has been built up to the point where the valve is about to open.

Figure 2 is a vertical section showing the parts in their alternative operative position.

Similar reference characters indicate like parts throughout the several figures.

A valve casing 10 having an inlet 11 and an outlet 12 is arranged in a conduit so that fluid from one source may enter at inlet 11. Casing 10 is provided with a second inlet 13 surrounded by a cage like structure 14 consisting of short pieces of flanged channel sections 15 and 16 arranged in crossed relation as shown at 17 and attached to the casing 10 in any suitable manner. Air is admitted through structure 14 in the embodiment illustrated, but, as will be readily understood, a conduit may be substituted for said structure in order that fluid such as enters the inlet 11 may be caused to enter inlet 13. In the illustrated embodiment, the outlet from casing 10 leads to a compressor, the inlet 11 is connected to the casing head of an oil well from which gas is flowing, and inlet 13 is in communication with the atmosphere. The compressor supplies fluid, either gas or air, to other oil wells to cause the oil to flow, using gas for this purpose when it is available but shifting to air to maintain a substantially uniform flow of fluid to the compressor. The regulator of this invention is especially designed to automatically control the fluid flow to the compressor. It is obvious, however, that the regulator is adapted for use in many other situations, and that it can be used to alternately control the flow from several sources of fluid, either of like or unlike character.

A suitable wall 18 provided with a valve seat 19 of suitable material separates inlet 11 from outlet 12. Inlet 13 is provided with a suitable valve seat 20 surrounding the opening in casing 10 that constitutes said inlet. Valves 21 and 22 control the flow of fluid from inlets 11 and 13 to outlet 12, said valves being so disposed on valve stem 23 that when one of the valves is open the other is closed.

Valve stem 23 is provided with an enlargement 24 providing a shoulder located in a recess 25 in the body 26 of valve 21. Body 26 is provided with an externally threaded tubular extension 27 surrounding valve stem 23. Valve guide member 28 having the usual guiding ribs 29 is threaded on extension 27 clamping a packing disk 30 of suitable material between the body and the guide member. Nuts 31 threaded on stem 23 serve to lock the parts in adjusted position.

The lower end of stem 23 is reduced in diameter as shown at 32. Threaded upon the stem 23 is an abutment in the form of a nut 33 locked in position by lock nut 34. Valve 22 comprising a body 35, guide member 36, and packing disk 37 secured together as above described with respect to the valve 21 is inserted on stem 32 and against abutment 33. A coil spring 38 adjustably held in engagement with valve 22 by a nut 39 serves to yieldingly hold said valve in engagement with said abutment. A bushing 40 is arranged between valves 22 and stem 32.

Valve stem 23 above the enlargement 24 is provided with a removable cap 41. Slidably mounted on stem 23 is a spring release cam member 42 provided with an externally threaded extension fitting in a diaphragm stem 43. Said stem is provided with a long bore 44 in which cap 41 is designed to slide as the diaphragm stem moves until said cap contacts with the extension on member 42. Diaphragm stem 43 has a reduced threaded extension 45. Diaphragm 46 is secured to said extension by threaded sleeves 47 and 48 clamping between them the diaphragm and the diaphragm supporting plates 49 and 50 of any well known form.

The valve casing 10 is provided with an annular shoulder 51 to which is bolted a plate 52 by bolts 53. Plate 52 is perforated centrally and surrounds diaphragm stem 43, a suitable packing gland 54 being provided around said opening. Secured to said plate 52 are spring arms 55 each arm carrying a latch member 56 including a latching shoulder 57 and a cam 58 arranged adjacent thereto. The valve body 26 is provided with an annular flange or shoulder 59 arranged in position to be engaged by said latch members to hold the valve in raised position.

Valve casing 10 is flanged at its upper end as shown by the numeral 60. A valve head 61 provided with securing flanges 62 is secured to flange 60 by bolts 63 clamping the edge of the diaphragm 46 therebetween.

Threaded in sleeve 48 movable with diaphragm 46 is a rod 64 passing loosely through head 61 and through a bushed opening in top casting 65 bolted to head 61 by bolts 66. Rod 64 has a head 67 provided with bifurcated ears 68 perforated to receive a pin 69 passing through an opening in weight lever bracket 70.

Secured to top casting 65 is a lever 71 pivoted at 72 to said casting and connected by means of a pin 73 to bracket 70. Bolted to bracket 70 is an angular weight supporting lever 74. A weight 75, having flanges 76 arranged on opposite sides of said lever, rolls on said lever. The ends 77 of said lever are turned upwardly to constitute stops for the movable weight. The lever is provided further with a series of spaced openings 78', designed to receive the shanks of securing bolts 79 that are provided to attach an adjustable stop 78 in any one of a number of positions along said lever. Said stop 78 is provided with a spring clip 80 designed to hold the weight from accidental displacement. Cushioning material 81 of any kind is provided for each stop to reduce the jar incident to the movement of the weight.

Pivotally secured to lever 74 at 82 between its ends is a trigger 83 in the form of a lever, one end of which is preferably offset with respect to the other. A stop rod 84 secured to head 61 and projecting in the path of movement of trigger 83 serves to hold it in an inoperative position when the valve stem is in its lowermost position. As the end 85 of said trigger is the heavier end the trigger will tend to approach a vertical position when permitted to do so by the shifting of lever 74. An anti-friction roller 86 is provided on the operative end of trigger 83.

In operation, as illustrated in Figure 1 air is flowing to outlet 12 through valve 22. At the same time the pressure of gas from the casing head of an oil well, for example, is building up adjacent closed valve 21. This pressure is communicated to diaphragm 46 through an opening 87 in plate 52. As the pressure becomes sufficient to raise the weighted lever 74 the diaphragm 46 will rise carrying with it cam member 42 and diaphragm stem 43. This movement of the cam member permits the latch members 56 to spring toward each other in position to engage flange or shoulder 59 on valve 21. Movement of the diaphragm of insufficient extent to cause the weight to roll to the other end of lever 74 will have no effect on the valves 21 or 22. However, when the pressure in inlet 11 has reached a predetermined value the weight is caused to move toward the other end of the lever 74, the movement of the weight being restrained by the upwardly projecting finger 80 until the pressure has risen in the inlet and the race-way 74 has assumed a slight angle. When this angle is sufficient to cause weight 76 to ride over finger 80, the momentum of the moving weight is sufficient to carry it definitely past the pivot of the race-way and the position of valves 21 and 22 is reversed. Such movement causes a quick opening of valve 21 and an equally rapid closing of valve 22. The latches 56 hold the valve in raised position and the gas begins to flow to outlet 12 from inlet 11, the air flow being discontinued at the same time. It will be noted that the roller 86 of trigger 83 will not prevent the weight 76 moving to the left hand end of the race-way. However, when the race-way assumes the position shown in Figure 2, the trigger 83 prevents the weight from rolling to the right hand end of the race-way until the pressure from inlet 11 falls below a predetermined minimum. A slight drop in pressure will cause the weight to roll to the right until it rests against roller 86 of trigger 83, and in this manner reverse movement of the valves is prevented due to slight fluctuations of pressure in the inlet. When the predetermined minimum pressure is reached the stop 84 will have moved trigger 83 such that roller 86 is depressed below the race-way and the weight will roll sharply to the right, the momentum thereof carrying it over the finger 80 to the position of Figure 1.

As the pressure of the gas in inlet 11 drops the weight 75, causes the diaphragm 46 and the parts carried thereby to be lowered thus bringing cam member 42 into position to engage cams 58 on latch members 56. As the pressure continues to drop and reaches a predetermined minimum value, the cam member 42 releases the latches 56, the trigger 83 drops to the position shown in Figure 1, the weight rolls to the other end of the lever and the valves 21 and 22 are shifted to a position in which the flow from inlet 11 is cut off until the pressure in this inlet builds up to the required amount when the valves 21 and 22 are again automatically shifted to restore the flow of gas.

It will thus be seen that a regulator is provided that will automatically maintain the flow of a fluid from a control source as long as the pressure from that source remains above a predetermined limit, that said regulator will automatically stop said flow when the pressure drops below said limit and start the flow from a second source simultaneously therewith. Said regulator will likewise automatically shut off the flow from the second source when the pressure in the control source has been restored.

The invention has been above described in details, though the invention is not restricted to such detail. The scope thereof is to be determined from the following claims. Accordingly, what is desired to be secured by Letters Patent and is claimed as new is:

1. An automatic flow regulator having a plurality of inlets and a single outlet, a plurality of valves movable as a unit controlling the flow from either of said inlets to said outlet, and means controlled by variations in pressure beyond a predetermined limit in one of said inlets to shift said valves with a snap movement and put the other inlet in communication with said outlet, said means including a lost motion connection to said valves and means to move said valves in either direction with a snap movement.

2. An automatic flow regulator comprising a plurality of inlets and a single outlet, valves movable as a unit to alternately simultaneously connect said outlet with one of said inlets, means to move said valves with a snap motion to two alternate positions including a diaphragm responsive to pressures in said last named inlet to control the movement of said valves in one direction and variable mechanical means controlled by said diaphragm to regulate the movement of said valves in the other direction.

3. An automatic flow regulator comprising a plurality of inlets and a single outlet, a plurality of valves secured together for movement as a unit to alternately put one of said inlets in communication with said outlet, means controlled by the pressure in one of said inlets and movable a substantial distance independently of said valves, and a mechanism to actuate said valve, said mechanism being brought into position for quickly manipulating said valves and released by the movement of said means.

4. An automatic flow regulator comprising a plurality of inlets and a single outlet, spaced walls having openings separating said inlets from said outlet, valves connected together to move as a unit, one of said valves being yieldable bodily with respect to the other, means controlled by the pressure in one of said inlets to initiate actuation of said valves in one direction and to control their movement in the other direction, and a counter-weight acting in opposition to said means to quickly shift the valves in both of its directions of movement.

5. An automatic flow regulator comprising a plurality of inlets and a single outlet, spaced walls having openings separating said inlets from said outlet, valves connected to move as a unit controlling the flow through said openings, an element movable toward and away from said openings and controlled by the pressure in one of said inlets, a lost motion connection between said element and valves, and means including a shifting weight controlled by the movement of said element to actuate said valves with a snap action in both directions when the pressure in said inlet reaches a predetermined limit.

6. An automatic regulator comprising a valve casing, a valve seat in said casing, an outlet, an inlet, a valve controlling the flow from said inlet to said outlet, a valve stem, a diaphragm, means secured to said diaphragm and attached to said valve stem by a lost motion connection, cam means carried by said first named means, mechanism to hold said valve in its elevated position, said mechanism being controlled by said cam means, means to cause the pressure in said inlet to move said diaphragm and adjustable elements counteracting the pressure on the diaphragm, said last named means comprising a shifting weight movable to opposite sides of the valve stem and causing a snap action of said valve when said mechanism is released by said cam means.

7. An automatic regulator including a valve, a diaphragm connected to said valve by a lost motion connection and controlled by the pressure imposed on one side thereof, cam means movable with said diaphragm, latching means for holding the valve in its elevated position, said latching means being arranged to be actuated by said cam means, a counterweight opposing action of said diaphragm, said counterweight being arranged to move quickly to either of two extreme positions when the pressure on one side of the diaphragm reaches predetermined upper and lower limits but being unaffected by variations between said limits.

8. An automatic flow regulator comprising a casing including a plurality of inlets and a single outlet, a plurality of valves movable as a unit to alternately connect one of said inlets with said outlet, and valve operating means for actuating said valves by a snap action including a diaphragm controlled by the pressure in one of said inlets and connected to said valves by a connection that permits substantial movement of the diaphragm without affecting the valves up to predetermined limits of pressure, and an adjustable weight to positively actuate said valves in both directions when said pressure reaches said limits, said weight having means associated therewith for retaining it against movement in either direction by small variations in pressure.

9. An automatic flow regulator including a casing, a valve controlled by the pressure of fluid passing through said casing, a shoulder on said valve, latches secured to said casing and yieldingly pressed toward the path of movement of said shoulder to positively engage therewith and retain said valve in one position, a diaphragm secured to said valve by means that permits it to move substantially with respect thereto, means carried by said diaphragm to spread said latches away from said path and release said valve carried by said diaphragm, and a rolling weight to quickly actuate the valve when said last named means positively disengages said latches from said shoulder.

10. An automatic flow regulator including a casing, a valve in said casing, a diaphragm responsive to pressure in said casing and secured to said valve by a connection that permits substantial fluctuation of pressure without affecting said valve, a weighted lever having angularly disposed portions secured to said casing and connected between its ends to said diaphragm, a weight arranged to roll from one side of the point of attachment between said lever and casing to the other side thereof, and a trigger arranged to hold the weight at one side of said point until the movement of the diaphragm has been sufficient to withdraw it from the path of the weight.

11. An automatic regulator comprising a casing, a control valve in said casing, a diaphragm controlled by the pressure of the fluid in the casing, said diaphragm being secured to said valve in a manner permitting substantial movement thereof without affecting said valve, a weighted lever pivotally secured to said casing and connected to said diaphragm, a weight arranged on said lever to roll from one side to the other side of its pivotal point to actuate said valve, a trigger pivoted to said lever, a stop on said casing causing the trigger to move out of the path of said weight when the diaphragm shifts said lever into position for actuation of said valve.

12. An automatic regulator comprising a casing, a valve controlling the flow of fluid through said casing, a valve stem, a diaphragm, a diaphragm stem surrounding said valve stem, a cam member secured to said diaphragm stem, a head on said valve stem, said valve stem being slidable relative to the diaphragm stem, a shoulder on said valve, latches yieldingly pressed in the path of movement of said shoulder to positively engage therewith and hold said valve in one position and in position to be positively released from said shoulder by said cam member when the pressure in said casing exceeds a predetermined amount, and means to cause said valve to close quickly when said latches are released by said cam member.

13. An automatic flow regulator arranged between a compressor and a plurality of independent sources of fluid comprising a plurality of valves movable as a unit to alternately put said sources in communication with said compressor, a valve stem, a rolling weight arranged to quickly shift said valves to either of its positions, and a diaphragm controlled by the pressure in one of said sources to control the movements of said weight in both directions, said weight acting to quickly snap said valves from either position thereof when the diaphragm moves beyond a predetermined limit.

14. An automatic flow regulator comprising a valve casing, a valve seat in said casing, an outlet, an inlet, a valve controlling the flow from said inlet to said outlet, a diaphragm connected to said valve in a manner permitting substantial relative movement between said diaphragm and valve, latch means to hold said valve open, means carried by said diaphragm to retract said latch means to release said valve after the diaphragm has moved beyond a predetermined limit, and means to supplement the action of the diaphragm when it moves in both directions.

15. An automatic flow regulator comprising a valve casing, a valve seat in said casing, an outlet, an inlet, a valve controlling the flow from said inlet to said outlet, a diaphragm connected to said valve in a manner permitting substantial relative movement between said diaphragm and valve, latch means to hold said valve open, means carried by said diaphragm to retract said latch means to release said valve after the diaphragm has moved beyond a predetermined limit, a lever secured to said diaphragm and tilted about a pivot as said diaphragm moves, and a shifting weight mounted on said lever, said weight being so disposed that it will shift from one side of the pivot of said lever to the other side thereof when the movement of the diaphragm reaches a predetermined limit in either direction of its movement.

16. An automatic flow regulator comprising a valve casing, a valve seat in said casing, an outlet, an inlet, a valve controlling the flow from said inlet to said outlet, a diaphragm connected to said valve and controlling its movements, a lever pivoted between its ends and connected to said diaphragm adjacent its pivot, a weight mounted on said lever and arranged to roll from one side to the other of said pivot when the movement of said lever under the influence of said diaphragm exceeds a predetermined amount, a trigger pivoted to said lever and arranged to be automatically projected in the path of movement of said weight when the movement of the lever has reached a predetermined amount and to be automatically retracted out of the path of said lever when the movement of said lever in the opposite direction has reached the other limit of its movement.

In testimony whereof I affix my signature.
ALLEN D. MacLEAN.